US012612520B2

(12) United States Patent
Miyai et al.

(10) Patent No.: US 12,612,520 B2
(45) Date of Patent: Apr. 28, 2026

(54) GAS BARRIER FILM, AND PAINT COMPOSITION FOR FORMING GAS BARRIER LAYER

(71) Applicant: TOYO SEIKAN GROUP HOLDINGS, LTD., Tokyo (JP)

(72) Inventors: Tomohiro Miyai, Yokohama (JP); Kazuhiro Tsuruta, Yokohama (JP); Midori Itou, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 1022 days.

(21) Appl. No.: 17/627,460

(22) PCT Filed: Aug. 24, 2020

(86) PCT No.: PCT/JP2020/031776
§ 371 (c)(1),
(2) Date: Jan. 14, 2022

(87) PCT Pub. No.: WO2021/039692
PCT Pub. Date: Mar. 4, 2021

(65) Prior Publication Data
US 2022/0259437 A1     Aug. 18, 2022

(30) Foreign Application Priority Data

Aug. 23, 2019   (JP) ................................. 2019-152688

(51) Int. Cl.
*C09D 1/00*     (2006.01)
*C09D 7/40*     (2018.01)
*C09D 7/61*     (2018.01)

(52) U.S. Cl.
CPC ................. *C09D 1/00* (2013.01); *C09D 7/61* (2018.01); *C09D 7/67* (2018.01)

(58) Field of Classification Search
None
See application file for complete search history.

(56) References Cited

U.S. PATENT DOCUMENTS 3,821,014 A      6/1974  Haskell et al.
3,853,587 A     12/1974  Haskell et al.
(Continued)

FOREIGN PATENT DOCUMENTS

CN          1441856 A      9/2003
CN        108864905 A     11/2018
(Continued)

OTHER PUBLICATIONS

Liao et al., A gas barrier film composed of SiO2/Al2O3 multilayers on flexible substrates, Proc. of SPIE, 2007 (Liao) (Year: 2007).*
(Continued)

*Primary Examiner* — Keling Zhang
(74) *Attorney, Agent, or Firm* — Sughrue Mion, PLLC

(57) ABSTRACT

A gas barrier film including a reaction product formed by a reaction of a zirconium oxide and a phosphoric acid compound, where the zirconium oxide is an amorphous zirconium oxide containing as a main component zirconyl hydroxide and/or zirconium hydroxide. A gas barrier laminate including the gas barrier film and a composition for forming a gas barrier layer.

8 Claims, 2 Drawing Sheets

(56) References Cited

U.S. PATENT DOCUMENTS

| 3,853,588 | A | 12/1974 | Haskell et al. |
|---|---|---|---|
| 3,853,591 | A | 12/1974 | Haskell et al. |
| 3,857,723 | A | 12/1974 | Haskell et al. |
| 3,885,079 | A | 5/1975 | Haskell et al. |
| 9,260,622 | B2 | 2/2016 | Yoshida et al. |
| 10,814,350 | B2 | 10/2020 | Yoshida et al. |
| 2003/0152704 | A1 | 8/2003 | Haruta et al. |
| 2007/0082159 | A1 | 4/2007 | Mathieu et al. |
| 2007/0299182 | A1 | 12/2007 | Mathieu et al. |
| 2009/0272293 | A1 | 11/2009 | Ono |
| 2010/0084330 | A1 | 4/2010 | Wong |
| 2016/0152371 | A1 | 6/2016 | Ichinose et al. |
| 2016/0244886 | A1 | 8/2016 | Ha et al. |

FOREIGN PATENT DOCUMENTS

| EP | 4 129 666 | A1 | 2/2023 |
|---|---|---|---|
| JP | 57-042032 | B2 | 9/1982 |
| JP | 62-226807 | A | 10/1987 |
| JP | 2006-524732 | A | 11/2006 |
| JP | 2008-503632 | A | 2/2008 |
| JP | 2011-178930 | A | 9/2011 |
| JP | 2012-504546 | A | 2/2012 |
| JP | 4961054 | B2 | 6/2012 |
| JP | 2014-136185 | A | 7/2014 |
| JP | 2015-030538 | A | 2/2015 |
| JP | 2016-150492 | A | 8/2016 |
| WO | 2008/053694 | A1 | 5/2008 |
| WO | 2012/091426 | A2 | 7/2012 |

OTHER PUBLICATIONS

Machine translation of Ji et al., JP4961054 B2 (Year: 2012).*

Kempenaers, The basics of elemental analysis with XRF, https://www.malvernpanalytical.com/en/learn/knowledge-center/insights/the-basics-of-elemental-analysis-with-xrf-qa, 2020 (Year: 2020).*

Office Action issued Feb. 14, 2022 in corresponding Japanese Application No. 2021-542872.

International Search Report of PCT/JP2020/031776 dated Oct. 20, 2020 [PCT/ISA/210].

Extended European Search Report dated Aug. 16, 2023 in European Application No. 20857693.4.

Chinese Office Action dated Dec. 5, 2022 in Chinese Application No. 202080055058.X.

* cited by examiner

GAS BARRIER FILM, AND PAINT COMPOSITION FOR FORMING GAS BARRIER LAYER

CROSS REFERENCE TO RELATED APPLICATIONS

This application is a National Stage of International Application No. PCT/JP2020/031776, filed Aug. 24, 2020, claiming priority to Japanese Patent Application No. 2019-152688, filed Aug. 23, 2019.

TECHNICAL FIELD

The present invention relates to a gas barrier film containing a zirconium oxide and a phosphoric acid compound as constituent components, and more particularly relates to: a gas barrier film with excellent oxygen barrier properties and moisture barrier properties as well as excellent transparency; a composition capable of forming the gas barrier film, and a gas barrier laminate containing the gas barrier film.

BACKGROUND ART

Gas barrier laminates produced by forming a film containing a metal atom and a phosphorus atom as constituent components on a plastic base have been known in the art.

For example, Patent Document 1 proposes a substantially continuous and substantially amorphous gas transmission prevention film including a metal orthophosphate salt, the metal orthophosphate salt having a metal to phosphorus atomic ratio from about 2.3 to 0.5, in which from 50 to 100% of the metal atoms are aluminum, from 0 to 50% of the metal atoms are selected from tin, titanium, and zirconium, and from 0 to approximately 20% of the metal atoms are selected from zinc, chromium, and magnesium.

However, such a gas transmission prevention film has not yet been satisfactory in terms of its oxygen barrier properties and water vapor barrier properties. To solve such issues, Patent Document 2 describes a composite structural material including a base (X) and a layer (Y) stacked on the base (X), the layer (Y) containing a reaction product (S), the reaction product (R) being a reaction product formed by a reaction at least between a metal oxide (A) and a phosphorus compound (B), and in the infrared absorption spectrum of the layer (Y) in the range of 800 to 1400 cm$^{-1}$, the composite structural material has a wave number ($n^1$) at which the infrared absorption reaches maximum in the range from 1080 to 1130 cm$^{-1}$; and the metal oxide (A) contains a metal atom (M), which is aluminum.

CITATION LIST

Patent Literature

Patent Document 1: JP 57-042032 B
Patent Document 2: JP 4961054 B

SUMMARY OF INVENTION

Technical Problem

The composite structural material described in Patent Document 2 satisfies both oxygen barrier properties and water vapor barrier properties but contains aluminum as a main component, and Patent Document 2 does not describe a gas barrier coating film using a zirconium atom, which is stable to acid and alkali at ordinary temperature. That is, no gas barrier film possessing gas barrier properties to an extent equivalent to aluminum and using zirconium as a metal atom has been provided. The present inventors have diligently studied from these perspectives, and with a specific zirconium compound, even better gas barrier properties have been achieved.

Thus, an object of the present invention is to provide: a gas barrier layer having excellent oxygen barrier properties and water vapor barrier properties using a zirconium atom; a gas barrier layer forming composition for forming this gas barrier film (gas barrier layer), and a gas barrier laminate including this gas barrier film (gas barrier layer).

Solution to Problem

An embodiment of the present invention provides a gas barrier film characterized by including a reaction product formed by a reaction of a zirconium oxide and a phosphoric acid compound.

In the gas barrier film according to an embodiment of the present invention, the following are preferable:

1. the zirconium oxide is an amorphous zirconium oxide containing as a main component zirconyl hydroxide and/or zirconium hydroxide;
2. a net intensity ratio P(P-kα)/Zr(Zr-kα) of the zirconium oxide and the phosphoric acid compound measured by X-ray fluorescence measurement is in a range from 4.4 to 7.7;
3. the zirconium oxide is a fine particle with a primary particle size of 30 nm or less;
4. the phosphoric acid compound is at least one of orthophosphoric acid, metaphosphoric acid, a polyphosphoric acid, or a cyclic polyphosphoric acid; and
5. a haze at a coat weight of 1.0 g/m$^2$ is 30% or less.

An embodiment of the present invention also provides a gas barrier laminate characterized by including the gas barrier film arranged on a base film.

In the gas barrier laminate according to an embodiment of the present invention, the following are preferable:

1. the gas barrier laminate further includes an anchor coat layer arranged between the base film and the gas barrier film; and
2. an oxygen transmission rate is 25 cc/m$^2$·day·atm (40° C., 90% RH) or less, and a water vapor transmission rate is 5.5 g/m$^2$·day·atm (40° C., 90% RH) or less, in a case where the gas barrier laminate includes the base film containing a 12-μm thick polyethylene terephthalate, the gas barrier film with a coat weight of 1.0 g/m$^2$, and a 50-μm thick unstretched polypropylene film.

An embodiment of the present invention further provides a composition for forming a gas barrier layer, the composition characterized by containing a zirconium oxide and a phosphoric acid compound, in which a net intensity ratio P(P-kα)/Zr(Zr-kα) of the zirconium oxide and the phosphoric acid compound measured by X-ray fluorescence measurement is in a range from 4.4 to 7.7.

In the composition for forming a gas barrier layer according to an embodiment of the present invention, the following are preferable:

1. the zirconium oxide is an amorphous zirconium oxide containing as a main component zirconyl hydroxide and/or zirconium hydroxide;
2. the composition further contains hydrochloric acid or nitric acid as a deflocculant; and 3. the deflocculant is contained in an amount from 0.01 to 1.0 parts by mass relative to 100 parts by mass of the amorphous zirconium oxide.

Advantageous Effects of Invention

In the gas barrier film according to an embodiment of the present invention, using the zirconium oxide and the phosphoric acid compound allows the zirconium oxide to be phosphorylated to form a crosslinked structure and enables a uniform and dense coating film to be formed with excellent oxygen barrier properties and water vapor barrier properties. As a result, an embodiment of the present invention can provide a gas barrier film or a gas barrier laminate that can also be retort-sterilized.

In particular, using an amorphous zirconium oxide as the zirconium oxide enables the gas barrier film or laminate to achieve even better oxygen barrier properties and water vapor barrier properties, and using a fine particle zirconium oxide with a primary particle size of 30 nm or less allows the gas barrier film or laminate to have excellent transparency as well, having excellent transparency with a total light transmittance of 75% T or higher and a haze of 30% or less in a coat weight of 1.0 g/m$^2$.

DESCRIPTION OF EMBODIMENTS

Gas Barrier Film

Figure 1:
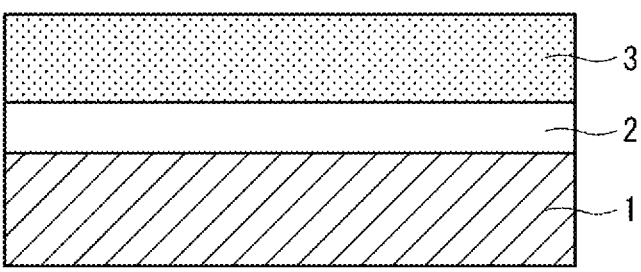
FIG. 1 is a diagram illustrating a cross-sectional structure of an example of a gas barrier laminate according to an embodiment of the present invention.

A gas barrier film according to an embodiment of the present invention includes a reaction product formed by a reaction of a zirconium oxide and a phosphoric acid compound, which is an important feature.

The zirconium oxide contains Zr and O as component elements, an amorphous zirconium oxide contains zirconium hydroxide ($Zr(OH)_4$) and/or zirconyl hydroxide ($ZrO(OH)_2$) as a main component, and a crystalline zirconium oxide contains a hydrated zirconium oxide ($ZrO_2.xH_2O$) and/or zirconium oxide ($ZrO_2$) as a main component. The "main component" means a component contained in a proportion of 50% or greater. The crystallinity of the zirconium oxide and the zirconium oxide formed into the gas barrier coating film can be evaluated by identifying the X-ray peak inherent in crystalline zirconium using a known X-ray structural diffractometer.

In an embodiment of the present invention, either a crystalline or amorphous zirconium oxide (zirconia) can be used as the zirconium oxide, but in particular, an amorphous zirconium oxide containing many hydroxyl groups used in a phosphorylation reaction is preferably used. This enables a uniform and dense coating film to be formed and have both oxygen barrier properties and moisture barrier properties.

In addition, the zirconium oxide desirably has an average particle size (D50) of the primary particle of 100 nm or less, preferably 50 nm or less, and more preferably 30 nm or less, and this can form a uniform coating film with excellent transparency. The average particle size (D50) is a volume average particle size measured by a laser diffraction scattering method, and D50 is a value of 50% in the particle size distribution based on volume. Using such a zirconium oxide in fine particle form as a raw material enables the gas barrier film to exhibit excellent transparency.

Examples of the phosphoric acid compound used in an embodiment of the present invention include orthophosphoric acid, polyphosphoric acids, phosphorous acid, phosphonic acid, and derivatives thereof. Specific examples of the polyphosphoric acid include pyrophosphoric acid, triphosphoric acid, and polyphosphoric acids in which four or more phosphoric acids are condensed. Examples of the derivative include orthophosphoric acid, polyphosphoric acids, phosphorous acid, phosphonate salts, (partial) ester compounds, halides (such as chloride), and dehydrates (such as diphosphorus pentoxide). In addition, examples of the derivative of phosphonic acid also include compounds in which a hydrogen atom directly bonded to a phosphorous atom of phosphonic acid ($H—P(=O)(OH)_2$) is substituted with an alkyl group that may have a functional group of various types (e.g., such as nitrilotris(methylene phosphonic acid) and N,N,N',N'-ethylenediaminetetrakis(methylenephosphonic acid)), salts thereof, (partial) ester compounds, halides, and dehydrates. Furthermore, an organic polymer having a phosphorus atom, such as a phosphorylated starch, can also be used. These phosphoric acid compounds can be used alone or in combination of two or more.

In an embodiment of the present invention, in particular, at least one of orthophosphoric acid, metaphosphoric acid, polyphosphoric acids, or cyclic polyphosphoric acids is preferably used.

The gas barrier film according to an embodiment of the present invention includes a reaction product of the zirconium oxide and the phosphoric acid compound and more particularly is a gas barrier coating film characterized in that phosphate ester bonds are formed, and the zirconium oxide and the phosphoric acid compound are crosslinked. The gas barrier coating film has an absorption peak whose maximum infrared absorption is in a range of 1000 to 1050 cm$^{-1}$ in an infrared absorption spectrum in a range of 800 to 1400 cm$^{-1}$ by FT-IR measurement of the gas barrier coating film alone, and the gas barrier coating film includes a composite structure containing a metal atom constituting the zirconium oxide and a condensate of the phosphoric acid compound and phosphoric acid.

In addition, in the gas barrier film according to an embodiment of the present invention, a net intensity ratio P(P-kα)/Zr(Zr-kα) of the zirconium oxide and the phosphoric acid compound by X-ray fluorescence measurement is in a range from 4.4 to 7.7 and particularly in a range from 6.3 to 7.6. With the net intensity ratio P(P-kα)/Zr(Zr-kα) in the above range, the phosphoric acid compound efficiently reacts without excess or deficiency of hydroxyl groups of the zirconium oxide in the film (coating film), and this enables a uniform and dense coating film to form and exhibit excellent oxygen barrier properties and water vapor barrier properties. That is, if the net intensity ratio by X-ray fluorescence measurement is smaller than the above range, meaning the phosphoric acid compound is deficient, bonding between the zirconium particles would be insufficient, the amount of hydroxyl groups present on the surface of the zirconium particle would increase, and this may reduce the oxygen barrier properties and water vapor barrier properties. On the other hand, if the net intensity ratio of X-ray fluorescence measurement is greater than the above range and the phosphoric acid compound is in excess, the amount of hydroxyl groups derived from phosphate groups would increase, and this may also reduce the oxygen barrier properties and water vapor barrier properties.

5

6

Composition for Forming Gas Barrier Layer

A composition for forming a gas barrier layer, the composition capable of forming the gas barrier film, according to an embodiment of the present invention may be either a water-based or solvent-based composition as long as the composition contains the zirconium oxide and the phosphoric acid compound described above, but the composition is preferably an aqueous composition.

In the composition for forming a gas barrier layer, a sol containing a zirconium oxide fine particle as a dispersoid is preferably used as the zirconium oxide. More preferably, a dispersion liquid with excellent transparency and viscosity stability prepared by dispersing this sol in the presence of a deflocculant is desirably used. Such a deflocculant can be exemplified by nitric acid, hydrochloric acid, perchloric acid, formic acid, acetic acid, citric acid, malic acid, and lactic acid, but among these, a dispersion liquid prepared using acetic acid, hydrochloric acid, nitric acid, or citric acid can be preferably used. Using such a dispersion liquid facilitates uniformly dispersing the zirconium oxide in the composition for forming a gas barrier layer or the gas barrier layer coating film and can further improve the gas barrier properties.

The deflocculant is preferably added in an amount from 0.01 to 1.0 parts by mass and particularly preferably from 0.1 to 0.4 parts by mass relative to 100 parts by mass of the zirconium oxide. The deflocculant added in an amount less than the above range may fail to improve the dispersibility of the zirconium oxide fine particle; on the other hand, the deflocculant added in an amount greater than the above range would only increase the cost but provide no advantage.

The phosphoric acid compound and the zirconium oxide are then mixed in a solvent capable of dissolving the phosphoric acid compound.

For such an aqueous medium, a known aqueous medium, such as distilled water, ion-exchanged water, or pure water, can be used, and the composition can contain an organic solvent like a known aqueous composition, the organic solvent including an alcohol, a polyhydric alcohol, or a derivative thereof. When such a cosolvent is used, the composition can contain from 1 to 90 wt. % of the cosolvent relative to a resin content in the aqueous composition. The composition containing a solvent in the above range improves film-forming performance. Such an organic solvent preferably has amphiphilicity, and examples include methyl alcohol, ethyl alcohol, isopropyl alcohol, n-butanol, methyl ethyl ketone, butyl cellosolve, propylene glycol monopropyl ether, ethylene glycol monobutyl ether, propylene glycol monomethyl ether, propylene glycol monobutyl ether, dipropylene glycol monomethyl ether, dipropylene glycol monobutyl ether, tripropylene glycol monomethyl ether, and 3-methyl3-methoxybutanol.

In the composition for forming a gas barrier layer, the zirconium oxide and the phosphoric acid compound are preferably blended in a ratio such that a net intensity ratio P(P-kα)/Zr(Zr-kα) of the zirconium oxide and the phosphoric acid compound by X-ray fluorescence measurement is in a range from 4.4 to 7.7 and particularly in a range from 6.3 to 7.6 as described above.

In addition to the above components, the composition for forming a gas barrier layer can also contain a crosslinking agent, a metal complex, a macromolecular compound, a filler, a plasticizer, an antioxidant, an ultraviolet absorber, a flame retardant, a colorant, or the like.

Gas Barrier Laminate

A gas barrier laminate according to an embodiment of the present invention is a laminate in which the gas barrier layer (gas barrier film) including the zirconium oxide and the phosphoric acid compound described above is formed on at least one surface of a base, and preferably, as illustrated in FIG. 1, a gas barrier layer 3 is formed on a base 1 via an anchor coat layer 2 described below. The anchor coat layer 2 is a coating film with excellent adhesion to a plastic base 1; forming the gas barrier layer on this coating film significantly improves interlayer adhesion between the gas barrier layer and the plastic base and can effectively prevent peeling of the gas barrier layer from the base also when the gas barrier laminate is subjected to retort sterilization.

Figure 2:
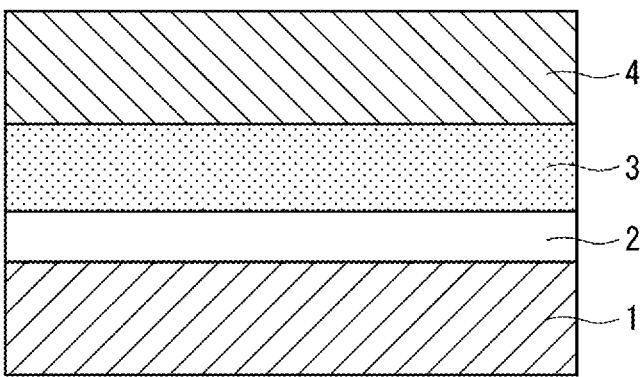
FIG. 2 is a diagram illustrating a cross-sectional structure of another example of a gas barrier laminate according to an embodiment of the present invention.

In addition, in the gas barrier laminate according to an embodiment of the present invention, as illustrated in FIG. 2, a moisture resistant resin layer 4 including a thermoplastic resin, such as an unstretched polypropylene resin film, is preferably formed on the gas barrier layer 3.

The gas barrier laminate according to an embodiment of the present invention has sufficient gas barrier properties, particularly oxygen barrier properties and water vapor barrier properties, and has excellent oxygen barrier properties and retort resistance with an oxygen transmission rate (in accordance with JIS K-7126) of 25 cc/m²·day·atm (40° C., 90% RH) or less and a water vapor transmission rate of 5.5 g/m²·day·atm (40° C., 90% RH) or less in the case where gas barrier laminate includes a base film containing a 12-μm thick polyethylene terephthalate, the gas barrier film with a coat weight of 1.0 g/m², and a 50-μm thick unstretched polypropylene film.

In addition, the gas barrier laminate of the above configuration has excellent transparency with a total light transmittance of 75% T or higher and a haze of 30% or less.

Base

For the base of the gas barrier laminate, a base known in the art containing a resin, such as a thermoplastic resin or a thermosetting resin; paper; or a fiber, such as a non-woven fabric, can be used, but preferably, examples can include films; sheets; or any packaging materials in a shape, such as a bottle, a cup, a tray, or a can; manufactured from a thermoformable thermoplastic resin by means, such as extrusion molding, injection molding, blow molding, stretch blow molding, or press molding.

The thermoplastic resin constituting the base can be exemplified by olefin-based copolymers, such as low-, medium-, or high-density polyethylenes, linear low-density polyethylenes, polypropylenes, ethylene-propylene copolymers, ethylene-butene-copolymers, ionomers, ethylene-vinyl acetate copolymers, and ethylene-vinyl alcohol copolymers; polyesters, such as polyethylene terephthalates, polybutylene terephthalates, polyethylene terephthalates/isophthalates, and polyethylene naphthalates; polyamides, such as nylon 6, nylon 6,6, nylon 6,10, and meta-xylylene adipamide; styrene-based copolymers, such as polystyrenes, styrene-butadiene block copolymers, styrene-acrylonitrile copolymers, and styrene-butadiene-acrylonitrile copolymers (ABS resins); vinyl chloride-based copolymers, such as polyvinyl chlorides and vinyl chloride-vinyl acetate copolymers; acrylic-based copolymers, such as poly(methyl methacrylate)s and methyl methacrylate-ethyl acrylate copolymers; and polycarbonates.

In an embodiment of the present invention, in particular, a sheet composed of a polyethylene terephthalate, a polybutylene terephthalate, or a polypropylene can be preferably used.

These thermoplastic resins may be used alone or may be present in the form of a blend of two or more. In addition, the plastic base body may have a single-layer configuration or a laminate configuration of two or more layers, for example, by simultaneous melt extrusion or other laminations.

To the melt-formable thermoplastic resin can be added as desired, one, or two or more of additives, such as a pigment, an antioxidant, an antistatic agent, an ultraviolet absorber, or a lubricant, in a total amount within a range from 0.001 parts to 5.0 parts relative to 100 parts by mass of a resin.

Furthermore, for example, to reinforce this container, one, or two or more of a fiber reinforcing material, such as a glass fiber, an aromatic polyamide fiber, a carbon fiber, a pulp, or a cotton linter; or a powder reinforcing material, such as a carbon black or white carbon; or a flake reinforcing material, such as a glass flake or an aluminum flake; can be blended in a total amount from 2 to 150 parts by mass relative to 100 parts by mass of the thermoplastic resin. Moreover, for the purpose of increasing the volume, one, or two or more of a heavy or soft calcium carbonate, mica, talc, kaolin, gypsum, clay, barium sulfate, an alumina powder, a silica powder, magnesium carbonate, or the like can be blended according to a formulation known per se in a total amount from 5 to 100 parts by mass relative to 100 parts by mass of the thermoplastic resin.

Still more, for the purpose of improving the gas barrier properties, a scaly inorganic fine powder, such as, for example, water-swelling mica or clay, may be blended according to a formulation known per se in a total amount from 5 to 100 parts by mass relative to 100 parts by mass of the thermoplastic resin without any limitation.

Similarly, for the purpose of improving the gas barrier properties, an inorganic-based thin film layer of, for example, silicon oxide or aluminum oxide may be provided on the plastic base physically or chemically using a vapor deposition method without any limitation.

In addition, the base may be a molded product, such as a final film, sheet, or container, or this coating can also be provided in advance to a preformed product to be formed into a container. Examples of such a preformed body can include bottomed or bottomless tubular parisons for biaxial stretch blow molding, pipes for direct blow molding, sheets for vacuum forming, pressure forming, and plug-assist forming, or films for heat seal lids or bag making.

Anchor Coat Layer

For the anchor coat layer formed on a surface of the base as necessary, an anchor coat layer used in a gas barrier laminate and known in the art, the anchor coat layer including a polyurethane-based resin including a polyol and an isocyanate compound can be used; however, the anchor coat layer including a polyurethane-based resin and a silane coupling agent, the anchor coat layer proposed by the present inventors, is preferable.

Polyurethane-Based Resin

For the polyurethane-based resin constituting the anchor coat layer, a known polyurethane-based resin that has been used as an anchor coat layer in the art can be used; in an embodiment of the present invention, however, a polyurethane-based resin with a glass transition temperature (Tg) of 80° C. or higher and particularly in a range of 80 to 120° C. is desirably used. With a polyurethane resin with a glass transition temperature lower than the above range, the anchor coat layer would have poor heat resistance compared to the one with a polyurethane resin with a glass transition temperature in the above range, and the gas barrier layer would have a crack when heating causes a difference in a contraction ratio between the anchor coat layer and the gas barrier layer, and this may reduce the barrier properties.

The polyol component, which is the main agent of the polyurethane-based resin, can be exemplified by glycols, polyester polyols, polyether polyols, acrylic polyols, or their urethane-modified products, but in particular, a glycol is preferably used.

The glass transition temperature of the polyester polyol is preferably from −50° C. to 100° C. and more preferably from −20° C. to 80° C. In addition, the number average molecular weight of these polyester polyols is preferably from 50 to 100000 and more preferably from 50 to 80000.

Examples of the glycol include ethylene glycol, propylene glycol, diethylene glycol, butylene glycol, neopentyl glycol, and 1,6-hexanediol.

Examples of the polyvalent carboxylic acid include aromatic polyvalent carboxylic acids, such as isophthalic acid, terephthalic acid, and naphthalene dicarboxylic acid; and aliphatic polyvalent carboxylic acids, such as adipic acid, azelaic acid, sebacic acid, and cyclohexane dicarboxylic acid.

For the isocyanate component, which is a curing agent for the polyurethane-based resin, an aromatic diisocyanate, an alicyclic diisocyanate, an aliphatic diisocyanate, or the like can be used.

The aromatic diisocyanate can be exemplified by a tolylene diisocyanate (2,4- or 2,6-tolylene diisocyanate, or their mixtures) (TDI), a phenylene diisocyanate (m-, p-phenylene diisocyanate or their mixtures), 4,4'-diphenyl diisocyanate, 1,5-naphthalene diisocyanate (NDI), a diphenylmethane diisocyanate (4,4'-, 2,4'-, or 2,2'-diphenylmethane diisocyanate, or their mixtures) (MDI), 4,4'-toluidine diisocyanate (TODI), and 4,4'-diphenyl ether diisocyanate.

The aromatic aliphatic diisocyanate can be exemplified by a xylene diisocyanate (1,3- or 1,4-xylene diisocyanate, or their mixtures) (XDI), a tetramethylxylene diisocyanate (1,3- or 1,4-tetramethylxylene diisocyanate, or their mixtures) (TMXDI), and ω,ω'-diisocyanate-1,4-diethylbenzene.

Examples of the alicyclic diisocyanate can include 1,3-cyclopentene diisocyanate, a cyclohexane diisocyanate (1,4-cyclohexane diisocyanate or 1,3-cyclohexane diisocyanate), 3-isocyanatomethyl-3,5,5-trimethylcyclohexyl isocyanate (isophorone diisocyanate, IPDI), a methylene bis(cyclohexyl isocyanate) (4,4'-, 2,4'-, or 2,2'-methylene bis(cyclohexyl isocyanate)) (hydrogenated MDI), a methylcyclohexane diisocyanate(methyl-2,4-cyclohexane diisocyanate or methyl-2,6-cyclohexane diisocyanate), and a bis(isocyanatomethyl)cyclohexane (1,3- or 1,4-bis(isocyanatomethyl) cyclohexane, or their mixtures) (hydrogenated XDI).

Examples of the aliphatic diisocyanate can include trimethylene diisocyanate, 1,2-propylene diisocyanate, butylene diisocyanate (tetramethylene diisocyanate, 1,2-butylene diisocyanate, 2,3-butylene diisocyanate, or 1,3-butylene diisocyanate), hexamethylene diisocyanate, pentamethylene diisocyanate, 2,4,4- or 2,2,4-trimethylhexamethylene diisocyanate, and 2,6-diisocianatomethyl caffeate.

The polyisocyanate component that can also be used include: a polyfunctional polyisocyanate compound, such as isocyanurate, biuret, or allophanate, derived from the polyisocyanate monomer; or a polyfunctional polyisocyanate compound containing a terminal isocyanate group obtained by a reaction with a trifunctional or higher polyol compound, such as trimethylolpropane or glycerin.

The polyisocyanate component preferably has a glass transition temperature (Tg) of 50° C. or higher and a number average molecular weight (Mn) of 400 or greater, and in particular, a glass transition temperature (Tg) of 60° C. or higher and a number average molecular weight (Mn) of 500 or greater.

In an embodiment of the present invention, among the above isocyanate components, a xylene diisocyanate is preferably used.

Silane Coupling Agent

For the silane coupling agent used in the anchor coat layer, an epoxy silane-based coupling agent can be preferably used.

Such an epoxy silane-based coupling agent that can be used include β-(3,4-epoxycyclohexyl)ethyltrimethoxysilane, 3-glycidoxypropylmethyldimethoxysilane, 3-glycidoxypropylmethyldiethoxysilane, 3-glycidoxypropyltriethoxysilane, and 3-glycidoxypropyltrimethoxysilane.

Other examples of the silane coupling agent include tetramethoxysilane, tetraethoxysilane, 3-aminopropyltrimethoxysilane, 3-aminopropyltriethoxysilane, and 3-isocyanatopropyltriethoxysilane, which can be used as necessary.

In addition, for the purpose of improving hot water resistant adhesion, these silane coupling agents can be subjected to hydrolysis to allow the condensation reaction to proceed. Such silane coupling agents may be used.

Composition for Forming Anchor Coat Layer

In an embodiment of the present invention, a composition for forming an anchor coat layer preferably contains the polyurethane-based resin and the silane coupling agent. In addition, the composition for forming an anchor coat layer may be either a water-based or solvent-based composition; however, the composition is desirably an aqueous composition, and thus the polyurethane-based resin to be used is desirably a water-soluble or water-dispersible polyurethane.

The composition for forming an anchor coat layer preferably contains an epoxy silane compound in an amount from 1 to 60 parts by mass relative to 100 parts by mass (solid content) of the polyurethane-based resin. The epoxy silane compound contained in an amount less than the above range would fail to satisfy crack resistance performance during drying compared to the epoxy silane compound contained in an amount in the above range; on the other hand, the epoxysilane compound contained in an amount greater than the above range would have a difficulty in further improving the adhesion and may rather impair hot water resistance.

In addition, for an aqueous medium, the composition for forming an anchor coat layer can contain an aqueous medium known in the art or an organic solvent, such as an alcohol, a polyhydric alcohol, or a derivative of them, which are similar to those used in the composition for forming a gas barrier layer.

In addition to the above components, the composition for forming an anchor coat layer may contain a known component, such as a curing accelerator catalyst; a filler; a softener; an anti-aging agent; a stabilizer; an adhesion promoter; a leveling agent; an antifoaming agent; a plasticizer; an inorganic filler; a tackifying resin; a fiber; a colorant, such as a pigment; or a usable time extender.

Method of Manufacturing Gas Barrier Laminate

In a method of manufacturing a gas barrier laminate according to an embodiment of the present invention, the composition for forming a gas barrier layer described above can be applied directly to at least one surface of the base described above, but preferably, the composition for forming an anchor coat layer is applied prior to applying the composition for forming a gas barrier layer.

A coat weight of the composition for forming an anchor coat layer is determined according to the contents of the polyurethane-based resin and the silane coupling agent in the composition and may not be specified unconditionally, but the composition is preferably applied to be in a range from 0.05 to 1.00 g/m² and particularly from 0.10 to 0.50 g/m² based on a solid content weight of the coating film. The anchor coat applied in an amount less than the above range may fail to adhere the anchor coat layer to the base compared to the anchor coat applied in an amount in the above range; on the other hand, the anchor coat applied in an amount greater than the above range would reduce economic efficiency.

The composition for forming an anchor coat layer applied onto the base body is dried at a temperature of 80 to 140° C. for 1 to 60 seconds to remove a solvent in the composition although the conditions depend on the composition to be used and the coat weight. This enables the anchor coat layer to be formed economically without affecting the base even if the base includes a plastic with a low melting point, such as a polypropylene.

The composition for forming a gas barrier layer is then applied onto the composition for forming an anchor coat layer in a dry state after the solvent removal. A coat weight of the composition for forming a gas barrier layer is determined according to the contents of the zirconium oxide and the phosphoric acid compound in the composition and may not be specified unconditionally, but the composition is preferably applied to be in a range from 0.05 to 2.0 g/m² and particularly from 0.3 to 1.0 g/m² based on a solid content weight of the coating film. The composition applied in an amount less than the above range would fail to provide sufficient barrier properties. On the other hand, the composition applied in an amount greater than the above range would only reduce economic efficiency but provide no special advantage.

The composition for forming a gas barrier layer is then heated at a temperature of 80 to 220° C., particularly of 140 to 220° C., for 1 second to 10 minutes to form the gas barrier layer although the conditions depend on the composition of the zirconium oxide and the phosphoric acid compound in the composition to be used and the coat weight. This reduces a difference in contraction due to heating of the gas barrier layer and the anchor coat layer and can improve the cracking resistance of the gas barrier layer as well as significantly improve the interlayer adhesion between the gas barrier layer and the anchor coat layer, and prevents peeling of the gas barrier layer from the base also when the gas barrier laminate is subjected to retort sterilization.

The application and drying or heating of the composition for forming an anchor coat layer and the composition for forming a gas barrier layer can be performed by methods known in the art.

The application method is not limited to the following, but the compositions can be applied, for example, by spray coating, immersion, or a bar coater, a roll coater, or a gravure coater.

In addition, the drying or heating can be performed by oven drying (heating), infrared heating, high-frequency heating, or the like.

EXAMPLES

The present invention will be further described by the following experimental examples, but the present invention is not limited in any way by the following examples. Various measurement methods and evaluation methods of the experimental examples are as follows.

Experimental Example 1

For a barrier coat paint, a zirconium oxide sol (Zirconia Sol ZSL-10T, available from Daiichi Kigenso Kagaku Kogyo Co., Ltd., amorphous zirconium oxide, solid content (in terms of $ZrO_2$) of 10%, particle size D (50) of 15 nm) was used as a metal oxide, and a water/methanol solvent was used to adjust a solid content to 4.2% and a ratio of water/methanol to 75/25. To the mixture, as additives, nitric acid (Wako Pure Chemical Industries, Ltd.) was added to give an acid content mass of 18 phr relative to a solid content of the zirconia sol (in terms of $ZrO_2$) and phosphoric acid (Wako Pure Chemical Industries, Ltd., concentration of 85%) was added to give a non-volatile content of phosphoric acid of 97 phr relative to a solid content of the zirconia sol (in terms of $ZrO_2$). The mixture was stirred for a predetermined time and used as a barrier coat paint.

Gas Barrier Laminate: Method for Producing Sample

A sample of the gas barrier laminate was performed as follows using the barrier coat paint produced. The barrier coat paint described above was applied onto a plastic base with a thickness of 12 μm (Lumirror P60, available from Toray Advanced Film Co., Ltd.) with a coat weight of 1.0 g/m² using a bar coater, heated and dried in a box oven at 220° C. for 10 minutes, and a sample of the gas barrier laminate was obtained.

Gas Barrier Laminate Film Laminate: Method for Producing Sample

A laminated laminate sample for gas barrier property evaluation was produced by applying a urethane-based adhesive (Takenate A-315/Takenate A-50 available from Mitsui Chemicals, Inc.) in a coat weight of 4.0 g/m² onto the barrier coat surface of the gas barrier laminate described above with a bar coater, drying in a dryer, and then laminating a unstretched polypropylene film with a thickness of 50 μm, and a gas barrier laminate film laminate shown in Experimental Example 1 was obtained.

Experimental Example 2

A gas barrier laminate and a gas barrier laminate film laminate were obtained in the same manner as in Experimental Example 1 except that phosphoric acid of the barrier coat paint was blended in an amount of 113 phr in Experimental Example 1.

Experimental Example 3

A gas barrier laminate and a gas barrier laminate film laminate were obtained in the same manner as in Experimental Example 1 except that phosphoric acid of the barrier coat paint was blended in an amount of 136 phr in Experimental Example 1.

Experimental Example 4

A gas barrier laminate and a gas barrier laminate film laminate were obtained in the same manner as in Experimental Example 1 except that phosphoric acid of the barrier coat paint was blended in an amount of 151 phr in Experimental Example 1.

Experimental Example 5

A gas barrier laminate and a gas barrier laminate film laminate were obtained in the same manner as in Experimental Example 1 except that phosphoric acid of the barrier coat paint was blended in an amount of 159 phr in Experimental Example 1.

Experimental Example 6

A gas barrier laminate and a gas barrier laminate film laminate were obtained in the same manner as in Experimental Example 1 except that phosphoric acid of the barrier coat paint was blended in an amount of 167 phr in Experimental Example 1.

Experimental Example 7

A gas barrier laminate and a gas barrier laminate film laminate were obtained in the same manner as in Experimental Example 3 except that hydrochloric acid was used for the deflocculant for the barrier coat paint in Experimental Example 3.

Experimental Example 8

A gas barrier laminate and a gas barrier laminate film laminate were obtained in the same manner as in Experimental Example 1 except that a zirconium oxide sol (ZSL-000120A: available from Daiichi Kigenso Kagaku Kogyo Co., Ltd., crystalline zirconium oxide, particle size D (50) of 5 nm) was used for the metal oxide of the barrier coat paint, and 66 phr of the added amount of phosphoric acid was blended in Experimental Example 1.

Reference Example

A laminate film laminate was obtained in the same manner as in Experimental Example 1 except that the barrier coat was not applied, and the 12-μm polyethylene terephthalate film used as the base was used in Experimental Example 1.

Evaluation Method

Evaluation results of the gas barrier laminates and the gas barrier laminated laminates were obtained as shown in Table 1 using the following evaluation methods.

Oxygen Transmission Rate

Each gas barrier laminate described in the experimental examples was measured using an oxygen transmission rate measuring device (OX-TRAN2/21, available from Modern Control Inc.). The measurement conditions were set at a temperature of 40° C. and a relative humidity of 90%.

Water Vapor Transmission Rate

Each gas barrier laminate described in the experimental examples was measured using a water vapor transmission rate measuring device (PERMATRAN-W 3/31, available from Modern Control Inc.). The measurement conditions were set at a temperature of 40° C. and a relative humidity of 90%.

X-Ray Fluorescence Evaluation

As a method for evaluating a metal element contained in each gas barrier laminate described in the experimental examples, the phosphorus element and the zirconium element can be quantified by a commercially available X-ray fluorescence analyzer. Net intensities obtained in each measurement were used to calculate a content ratio of metal elements in the coating film for P and Zr as P/Zr, and X-ray fluorescence evaluation was made.

Measurement Conditions for X-Ray Fluorescence Analyzer

Apparatus used: ZSX100e available from Rigaku Electrical Co., Ltd.

Measurement conditions: measurement targets Zr-Kα line, P-Kα line

Measuring diameter: 10 mm

Measured X-ray: Rh (4.0 kw) 50 kv 72 mA (2θ=from 0 to 90)

Film measurement surface: measured by injecting the X-ray from the barrier coating film surface side Optical Properties For the laminated laminate of each gas barrier film described in the experimental examples, a total light transmittance (TT: %) and haze (Hz: %) were measured by injecting the incident light of the measurement from the polyethylene terephthalate base side using a Color Computer (SM-4, Suga Test Instruments Co., Ltd.).

the zirconium oxide is an amorphous zirconium oxide containing zirconyl hydroxide and/or zirconium hydroxide, and the gas barrier film has an absorption peak whose maximum infrared absorption is in a range of 1000 to 1050 $cm^{-1}$ by FT-IR measurement of the gas barrier film alone.

2. The gas barrier film according to claim 1, wherein a net intensity ratio P(P-kα)/Zr(Zr-kα) of the phosphoric acid compound and the zirconium oxide by X-ray fluorescence measurement is in a range from 6.3 to 7.6.

3. The gas barrier film according to claim 1, wherein the zirconium oxide is a fine particle with a primary particle size of 30 nm or less.

TABLE 1

| | Metal oxide (NV = 10%) | | Phosphoric acid compound | | | | Drying | OTR (cc/m² · day · atm) | WVTR (g/m² · day) | X-ray Fluorescence | Optical properties | |
| | | Added amount | | Added amount | Deflocculant | | time | (40° C.- | (40° C.- | evaluation | TT | Hz |
| Sample | Species | (phr) | Species | (phr) | Species | (phr) | (° C.-min) | 90% RH) | 90% RH) | P/Zr | (%) | (%) |
|---|---|---|---|---|---|---|---|---|---|---|---|---|
| Experimental Example 1 | ZSL-10T | 100 | 85% Phosphoric acid | 97 | HNO₃ | 18 | 220-10 | 141 | 5.8 | 4.4 | 84 | 31 |
| Experimental Example 2 | ZSL-10T | 100 | 85% Phosphoric acid | 113 | Same as above | 18 | 220-10 | 89 | 5.3 | 5.1 | 83 | 26 |
| Experimental Example 3 | ZSL-10T | 100 | 85% Phosphoric acid | 136 | Same as above | 18 | 220-10 | 13 | 3.5 | 6.3 | 76 | 28 |
| Experimental Example 4 | ZSL-10T | 100 | 85% Phosphoric acid | 151 | Same as above | 18 | 220-10 | 5.1 | 4.0 | 7.1 | 79 | 26 |
| Experimental Example 5 | ZSL-10T | 100 | 85% Phosphoric acid | 159 | Same as above | 18 | 220-10 | 0.98 | 3.9 | 7.6 | 80 | 26 |
| Experimental Example 6 | ZSL-10T | 100 | 85% Phosphoric acid | 167 | Same as above | 18 | 220-10 | 61 | 6.0 | 7.7 | 85 | 24 |
| Experimental Example 7 | ZSL-10T | 100 | 85% Phosphoric acid | 136 | HCl | 18 | 220-10 | 20 | 5.2 | 6.4 | 84 | 27 |
| Experimental Example 8 | ZSL-000120A | 100 | 85% Phosphoric acid | 66 | HNO₃ | 18 | 220-10 | 41 | 6.0 | 3.4 | 89 | 27 |
| Reference Example | — | — | — | — | — | | — | — | — | 200 | 6.0 | — | 83 | 24 |

INDUSTRIAL APPLICABILITY

The gas barrier film according to an embodiment of the present invention has excellent gas barrier properties, in particular, excellent oxygen barrier properties and water vapor barrier properties, and can be preferably used as a transparent high barrier packaging material.

REFERENCE SIGNS LIST

1: Base

2: Anchor coat layer

3: Gas barrier layer (Gas barrier film)

4: Sealant layer

The invention claimed is:

1. A gas barrier film comprising a reaction product formed by a reaction of a zirconium oxide and a phosphoric acid compound, wherein

4. The gas barrier film according to claim 1, wherein the phosphoric acid compound is at least one of orthophosphoric acid, metaphosphoric acid, a polyphosphoric acid, or a cyclic polyphosphoric acid.

5. The gas barrier film according to claim 1, having a haze of 30% or less at a coat weight of 1.0 $g/m^2$.

6. A gas barrier laminate comprising the gas barrier film described in claim 1 arranged on a base film.

7. The gas barrier laminate according to claim 6, further comprising an anchor coat layer arranged between the base film and the gas barrier film.

8. The gas barrier laminate according to claim 6, having an oxygen transmission rate of 25 cc/m²·day·atm or less, measured at 40° C., 90% relative humidity, and a water vapor transmission rate of 5.5 g/m²·day·atm or less, measured at 40° C., 90% relative humidity, in a case where the gas barrier laminate comprises the base film containing a 12-μm thick polyethylene terephthalate, the gas barrier film with a coat weight of 1.0 g/m$^2$, and a 50-μm thick unstretched polypropylene film.

* * * * *